United States Statutory Invention Registration [19]

[11] Reg. Number: H543

Chen et al. [43] Published: Nov. 1, 1988

[54] LAMINATED CHROMIUM COMPOSITE

[75] Inventors: Edward S. Chen, Durham, N.C.; George P. Capsimalis, Ballston Lake, N.Y.

[73] Assignee: The United States of America as represented by the Secretary of the Army, Washington, D.C.

[21] Appl. No.: 919,957

[22] Filed: Oct. 10, 1986

[51] Int. Cl.[4] ..... B32B 15/00

[52] U.S. Cl. ..... 428/635; 428/666; 428/935

[58] Field of Search ..... 428/635, 636, 666, 935; 204/41

[56] References Cited

U.S. PATENT DOCUMENTS

| | | | |
|---|---|---|---|
| 1,845,978 | 2/1932 | Hosenfeld | 204/41 |
| 2,856,334 | 10/1958 | Topelian | 428/666 |
| 3,157,585 | 11/1964 | Durham | 204/41 |
| 3,421,986 | 1/1969 | Ruft | 204/41 |
| 3,461,048 | 8/1969 | Mahlstedt | 204/41 |
| 3,770,286 | 11/1973 | Angilella et al. | 204/41 |

FOREIGN PATENT DOCUMENTS

| | | | |
|---|---|---|---|
| 276674 | 10/1970 | U.S.S.R. | 204/41 |
| 568161 | 3/1945 | United Kingdom | 204/41 |

*Primary Examiner*—John F. Terapane
*Assistant Examiner*—Eric Jorgensen
*Attorney, Agent, or Firm*—Robert P. Gibson; Edward Goldberg; Edward F. Costigan

[57] ABSTRACT

This disclosure pertains to an electrodeposited chromium composite having alternating layers of high contraction and low contraction chromium. The laminated composite properties are enhanced because of thin layers of the same metal existing under different states of hardness, stress, orientation and microstructure. Thin layers of HC chromium are produced with a random orientation, low residual stress, and crack-free structure. The alternating LC chromium layers tend to duplicate the random structure of HC chromium through epitaxial growth. Accordingly, crack-free laminated chromium are produced having hardness values ranging from 655 to 1084 Knoop Hardness Numbers. By comparison, conventional high-contraction chromium shows hardness values between 1000 and 1100 KHN. However, the latter deposits are invariably microcracked.

7 Claims, 1 Drawing Sheet

Figure 1:
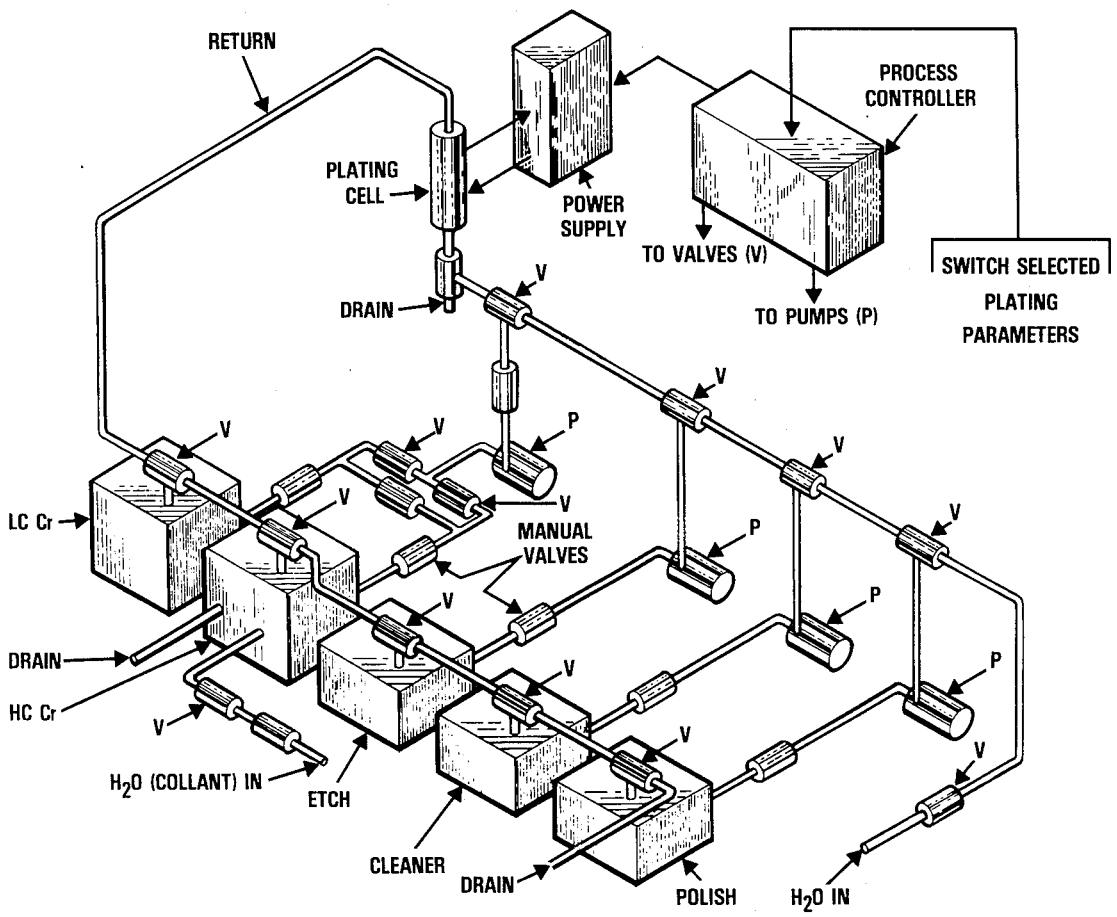

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

LAMINATED CHROMIUM COMPOSITE

GOVERNMENTAL INTEREST

The invention described herein may be manufactured, used and licensed by or for the Government for governmental purposes without payment to us of any royalties thereon.

FIELD OF USE

This invention relates to a laminated chromium composite and a process of making the same.

More particularly, this invention relates to a chromium composite having multiple laminae of low and high contraction chromium, and a process of making the same.

BACKGROUND

Electrodeposited chromium has a key role in providing the engineering needs of numerous manufactured products such as artillery pieces, gun barrels, and the like. The deposits in use are of two general classes: i.e. high contraction (HC) and low contraction (LC) chromium. The term "HC" stands for high contraction and refers to the tendency for as-plated hard chromium to shrink on heating. Due to its high hardness, high contraction chromium is commonly used as a protective coating to reduce galling and wear. Where corrosion is of concern, LC or low contraction chromium is used to take advantage of its crack-free and high strength characteristics. Conventional HC chromium deposits are weakened by the presence of cracks and are extremely brittle, while LC chromium deposits are much softer and therefore are susceptible to swaging under intense loading. It would be advantageous to produce deposits which combine the favorable characteristics of HC and LC chromium. One approach is through laminated plating.

The properties of laminated chromium have been observed in a number of studies and have been reported with reference to adhesion and crack formation. In all cases, the material cyclic nature of the plating process, current interruptions, or variations on plating temperature are responsible for the formation of the laminated structure. The present invention differs from all previous studies in that the laminations consist of alternating layers of two distinct types of chromium deposits rather than discontinuities brought about by a periodic current interruptions or current reversal. Through the use of a microprocessor-controlled plating system, the preparation of laminated deposits through programmed current modulation, and precise switching of plating solutions is made possible. In theory, such laminated structure should exhibit greatly altered mechanical properties, and a means of tailoring the strength and hardness of the deposit by varying the thickness of the various layers of high contraction and low contraction layers.

SUMMARY OF INVENTION

It is therefore an object of this invention to provide an improved laminated chromium composite, and a method of making the same.

Another object is to provide a chromium composite having multiple layers of high contraction chromium with layers of low contraction chromium therebetween.

A further object is to provide a process having parameters of temperature, current density, and exposure time to produce the various lamina of an improved laminated chromium composite.

These and other objects will become more apparent to a person skilled in the art from the following detailed specification when taken with the accompanying drawing wherein:

FIG. 1 is a schematic diagram of the automated plating system.

BEST MODE

Initially, chromium plating solutions were prepared by dissolving technical grade chromic acid (250 g/l), and sulfuric acid (2.5 g/l) in distilled water. The solutions were pre-electrolyzed for 250 A-hr/l, and stored in two 10-gallon polyethylene tanks maintained at 55° and 85°±1° C. Laminated deposits were prepared by pumping the plating solution through a flow cell and synchronizing the switching of current with the arrival of the respective high contraction or low contraction chromium solution. The electrolytic flow cell consists of an outer hollow cylindrical lead anode and an inner tubular brass cathode having a masked area of 10 $cm^2$.

Two series of laminated deposits were prepared for characterization. The first was prepared at HC/LC current densities of 45/120 $A/dm^2$ and at duty cycle times to produce layer thicknesses between 0.01 and 2.7 μm. The second series was plated at HC/LC current densities of 300/120 $A/dm^2$ with layer thicknesses between 0.36 and 0.77 μm. Electroformed chromium samples were obtained by dissolving the brass substrate in dilute nitric acid. Tensile strengths were measured with a table model Instron tensile machine using a crosshead speed of 0.05 cm/min. The procedures for mounting and testing the specimens have been reported elsewhere.

A Knoop diamond indentor was used to measure hardness at a 50 g load.

In the present situation current-time cycles were selected on the basis of two general grade-lines. First, current-time cycles were used to limit the build-up of high contraction chromium layers to about 0.5 μm. Secondly, high current densities between 200 and 300 $A/dm^2$ were used during the high contraction cycle to encourage the formation of random orientation. X-ray diffraction spectra clearly demonstrated that the high contraction laminations were random at these high current densities. Further, since it is known that the coalescence of crystallites is a primary cause of plating stress, the promotion of random orientation favors a reduction in stress.

FIG. 1 shows a schematic diagram of the automated system used in the preparation of laminated chromium. An Allen Bradley microprocessor is central to the system and was used to provide manual and automatic sequencing of valves, pump states, temperature, flow rates, and current modulation. The system was designed to provide hardware-software implementation of the laminated plating mode. This mode can be integrated with a clean, polish, and etch cycle to provide a reproducible and complete plating cycle.

Table 1 set forth below lists the strength and hardness of as-plated chromium in relation to the deposition conditions. The hardness was measured on surfaces perpendicular to the growth direction on 5 ml thick coatings. The results clearly show that hardness can be systematically varied between high contraction and low contraction chromium, i.e. 1089 and 655 KHN, by varying the lamination thickness. The harder deposits, run numbered 1 through 4, show a microcracked structure the severity of which appears to decrease with increasing low contraction layer thickness. Cracking in the deposits is also reflected in the unpredictable strength values we measured. The medium-hardness deposits, runs numbered 5 through 7, are crack-free. However, these deposits are severely stressed and longitudinal cracking occured on removal of the substrate. Runs numbered 8 through 11 resulted in crack-free deposits. A softer and stronger deposit was produced progressively by reducing the thickness of the high contraction layer. Runs numbered 12 and 13 show deposits with comparable hardness to high contraction chromium. These deposits, while crack-free, are also highly stressed.

TABLE I

LAYER THICKNESS, TENSILE STRENGTH, AND HARDNESS OF LAMINATED CHROMIUM ELECTRODEPOSITS

| Run No. | Layer Thickness HC/LC (μm)* | Duty Cycle HC/LC (sec)** | UTS (KSI) | Hardness (KHN) | Deposit Structure |
|---|---|---|---|---|---|
| 1 | All HC | — | 6.8 | 1089 | Microcracked |
| 2 | 0.30/0.77 | 30/30 | 15.9 | 1034 | Microcracked |
| 3 | 0.30/0.90 | 30/40 | 26.9 | 961 | Microcracked |
| 4 | 0.30/1.35 | 30/60 | 8.1 | 938 | Microcracked |
| 5 | 0.10/1.35 | 10/60 | — | 849 | Crack-free, stressed |
| 6 | 0.16/2.7 | 16/120 | — | 826 | Crack-free, stressed |
| 7 | 0.08/2.7 | 8/120 | — | 777 | Crack-free, stressed |
| 8 | 0.04/2.7 | 4/120 | 16.5 | 754 | Crack-free |
| 9 | 0.02/2.7 | 2/120 | 29.4 | 726 | Crack-free |
| 10 | 0.01/2.7 | 1/120 | 46.1 | 703 | Crack-free |
| 11 | All LC | — | 57.2 | 655 | Crack-free |
| 12 | 0.6/0.77 | 5/30 | — | 1084 | Crack-free, stressed |
| 13 | 0.36/0.77 | 3/30 | — | 1052 | Crack-free, stressed |

*Layer thicknesses were calculated from plating rates established for 55° C., 45 A/dm$^2$; 55° C., 300 A/dm$^2$; and 85° C., 120 A/dm$^2$.

**The HC/LC duty cycle was 45/120 A/dm$^2$ for run numbers 1–11 and 300/120 A/dm$^2$ for numbers 12 through 13.

Photomicrographs were taken of the laminated deposits after etching in a Murakami solution. The high contraction layers appeared as dark striations, while the low contraction layers appeared as light striations. The cracked structures were representative of the deposits associated with runs numbered 2, 3 and 4. It was evident that interrupting with low contraction layers was ineffective in preventing crack formation when the high contraction layer thickness was above about 0.3 μm. Nevertheless, it was interesting to note that, in these structures, all the cracks originated and terminated within the high contraction layers. However, when interruptions were imposed to limit the high contraction layer thicknesses between about 0.08 μm and 0.3 μm, the laminated deposits were crack-free. The microstructure which were typical of deposits in runs numbered 5, 6 and 7 showed regular striations as a series of lines parallel to the plane of deposit growth. In these runs, a fibrous structure which intersects the laminations produced decontinuities on the dark striations. In runs numbered 2, 3 and 4 the fibrous structure was finer and more numerous which made it difficult to distinguish. The microstructure typical of deposits produced in runs numbered 12 and 13 were encouraging because of the decrease in the presence of fibrous structure. These latter deposits were intentionally plated with randomly oriented high contraction layers in order to promote the epitaxial growth of low contraction layers. It is reasonably concluded from the relative absence of fibrous structures that the deposits from runs numbered 12 and 13 are more randomly oriented.

In conclusion, it has been shown that the structural and mechanical properties of electrodeposited chromium can be modified by plating laminated deposits consisting of alternating layers of high contraction and low contraction chromium. The features of the laminated plating process include the capacity of plating deposits with a hardness between 655 and 1089 KHN by varying the thickness of the cited layers. It also includes the plating of laminated deposits with random orientation and reduced plating stress. The conventional approach to the problem of the art is incapable of the flexibilities available with the laminated plating process. For example, if high hardness is produced, then one must contend with a deposit containing a cracked structure. However, with the present invention, crack-free laminated deposits can be produced with a hardness comparable to high contraction chromium, and this affords opportunities for acceptable chromium deposits for gun tubes in both the high and low caliber weaponry art.

What is claimed is:

1. An improved crack-free chromium composite comprising alternating ultra-thin layers of high concentration and low concentration chromium.

2. The crack-free chromium composite of claim 1 wherein said high concentration chromium is about 2.7 μm thick, and said low concentration chromium is about 0.01 μm thick.

3. The crack-free chromium composite of claim 2 having a hardness between about 685 and 1089, and a tensile strength as high as about 57.2.

4. An improved automated process of electroplating multiple layers of chromium on a substrate comprising, in repeated sequence, exposing said substrate to an aqueous plating solution of chromic acid and sulfuric acid maintained at a temperature of about 55° C. under a current density of between about 30 and 300 A/dm$^2$ for a period between about 0.5 and 3 seconds to produce an ultra-thin layer of high concentration chromium on said substrate, and then exposing said layer of chromium in situ to said same plating solution maintained at a temperature of about 85°0 C. under a current density between about 90 and 135 A/dm$^2$ for a period of about 2 to 30 seconds to produce an ultra-thin low concentration chromium layer on said high concentration ultra-thin layer of chromium.

5. The process of claim 4 wherein said aqueous plating solution is 250 g/l of chromic acid and 2.5 g/l of sulfuric acid.

6. The process of claim 5 wherein said ultra-thin layer of high contraction chromium is produced at about 55° C. under a current density of about 45 A/dm$^2$, said layer being 2.7 μm thick having a KHN of about 1089 and a tensile strength of about 57.2.

7. The process of claim 6 wherein said ultra-thin layer of low contraction chromium is produced at about 85° C. under a current density of about 120 A/dm$^2$, said layers being 0.01 μm thick having a KHN of about 685 and a tensile strength of about 6.8.

* * * * *